(12) United States Patent
Miyamura et al.

(10) Patent No.: US 12,217,776 B1
(45) Date of Patent: Feb. 4, 2025

(54) TAPE DRIVE WRITE ACROSS WRITE ERROR

(71) Applicant: International Business Machines Corporation, Armonk, NY (US)

(72) Inventors: Tsuyoshi Miyamura, Yokohama (JP); Setsuko Masuda, Toshima-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/404,197

(22) Filed: Jan. 4, 2024

(51) Int. Cl.
| | |
|---|---|
| *G11B 5/008* | (2006.01) |
| *G06F 5/06* | (2006.01) |
| *G11B 5/09* | (2006.01) |
| *G11B 5/55* | (2006.01) |
| *G11B 19/04* | (2006.01) |

(52) U.S. Cl.
CPC .............. *G11B 5/5508* (2013.01); *G11B 5/09* (2013.01); *G11B 19/041* (2013.01)

(58) Field of Classification Search
CPC . G11B 5/00813; G11B 27/107; G11B 15/662; G11B 5/584; G11B 5/55; G11B 5/588; G11B 20/18; G11B 5/52; G11B 15/093; G11B 15/46; G11B 15/52; G11B 15/43; G11B 5/5513; G11B 27/17; G06F 3/0619; G06F 3/0653; G06F 3/0682; G06F 11/1451; G06F 3/065; G06F 3/0686; G06F 11/106; G06F 11/1464

USPC ................................................ 360/48, 78.02
See application file for complete search history.

(56) References Cited

U.S. PATENT DOCUMENTS

| | | | |
|---|---|---|---|
| 6,624,958 B1 | 9/2003 | Alva | |
| 7,269,687 B2 | 9/2007 | Edling et al. | |
| 7,898,758 B2 | 3/2011 | Leopold, Jr. et al. | |
| 8,037,346 B2 | 10/2011 | Katagiri et al. | |
| 10,242,709 B1 | 3/2019 | Yamamoto et al. | |
| 10,818,314 B1 * | 10/2020 | Miyamura | G11B 5/00813 |
| 11,056,140 B1 | 7/2021 | Miyamura et al. | |
| 2008/0266699 A1 | 10/2008 | Masuda et al. | |

FOREIGN PATENT DOCUMENTS

| | | |
|---|---|---|
| JP | 2008016117 A | 1/2008 |
| JP | 2011248942 A | 12/2011 |
| JP | 2013030257 A | 2/2013 |

OTHER PUBLICATIONS

Anonymous, "Not write the data in defective tape direcoty region to avoid the error," an IP.com Prior Art Database Technical Disclosure, IP.com No. IPCOM000176956D, https://priorart.ip.com/IPCOM/000176956, Dec. 2, 2008, 2 pgs.

* cited by examiner

*Primary Examiner* — Nabil Z Hindi
(74) *Attorney, Agent, or Firm* — Scott S. Dobson

(57) ABSTRACT

A method for writing to tape by a tape drive is provided. The method includes, in response to identifying a write error during a write to a tape in a certain HRTD region, repositioning the tape to a next HRTD region. The method further includes continuing the write at the next HRTD region.

17 Claims, 10 Drawing Sheets

TAPE DRIVE WRITE ACROSS WRITE ERROR

BACKGROUND

The present disclosure relates to data storage systems, and more specifically, to magnetic tape data storage systems.

Linear tape-open (LTO) tape drives and IBM enterprise tape drives (TS11xx) are called linear tape drives. A linear tape drive allocates data on a tape in a longitudinal direction and records the data from the beginning of the tape to the end, then shifts the position slightly in the lateral direction of the tape, and then records data to the tape in the opposite longitudinal direction. The linear tape drive repeats this reciprocating operation several times with shifting in the lateral direction of the tape.

SUMMARY

According to embodiments of the present disclosure, a method for writing to tape by a tape drive is provided. The method includes, in response to identifying a write error during a write to a tape in a certain HRTD region, repositioning the tape to a next HRTD region. The method further includes continuing the write at the next HRTD region.

According to further embodiments of the present disclosure, a method for reading tape by a tape drive is provided. The method includes, in response to identifying a read error during a read of the tape in a certain HRTD region, repositioning the tape to a next HRTD region. The method further includes continuing the read at the next HRTD region.

According to further embodiments of the present disclosure, a tape storage system having a tape drive configured to perform the above methods is provided.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
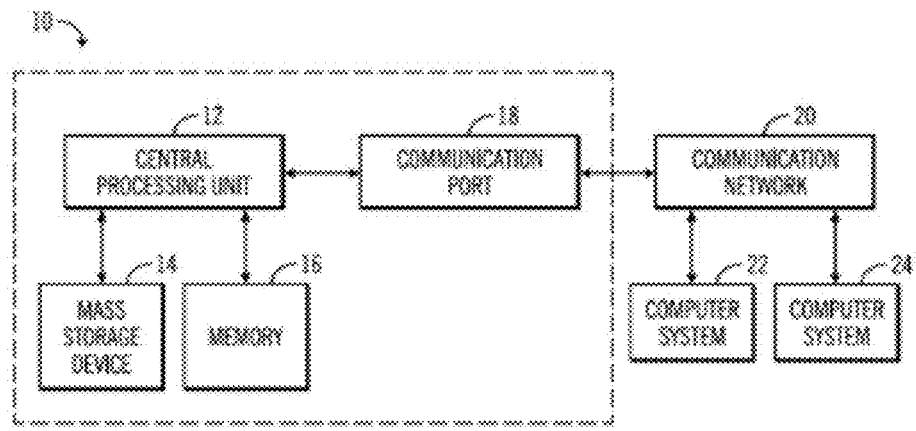
FIG. 1A illustrates an example computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to tape-based data storage, and more particular aspects relate to tape drive reading and writing when a write error occurs. While the present disclosure is not necessarily limited to such applications, various aspects of the disclosure may be appreciated through a discussion of various examples using this context.

A tape drive writes data linearly from the beginning of the tape to the end of the tape or from the end of the tape to the beginning of the tape along each wrap region which divides the tape width into multiple areas. Data records which are written by a host server are packed in a unit of a data set which are recorded from the beginning of the wrap to the end of the wrap. A part of the data set records a Data Set Information Table (DSIT) which stores the information of this data set.

The tape drive must move to a data position that it wants to read data or write new data from the data position when the host requests to read or write new data to the tape. The process to move to the target data location is called reposition. The reposition request is made by a record number or the file mark number. The host application can specify the target record number, target file mark number, or the target record and file mark. The file mark is a delimiter of each file on the tape which contains a multiple number of records. The tape drive does not know at which locations the record or file mark are physically written on the tape. The tape drive utilizes a mechanism of a Tape Directory (TD) to identify the target record location roughly.

One of the standards that defines tape properties is a Linear Tape Open® (LTO®) standard (Linear Tape Open and LTO and all LTO based trademarks and logos are trademarks or registered trademarks of Hewlett Packard Enterprise, IBM and Quantum and/or their affiliates). Another type of tape drive is TS11xx which is marketed by IBM. LTO tape drive stores the tape directory information per every half wrap, and it stores the last record number and last file mark number of the region. TD for tape drives such as the TS1160, TS1155, TS1150 (written as TS11xx in this disclosure), allocates a region to a wrap and stores the number of records and file marks that belong to the region. The TS1160 tape drive supports a tape directory which divides each wrap into 128 regions which is called a High Resolution Tape Directory (HRTD). HRTD of the TS1160 has 272 wraps×128 regions/wrap=34816 regions. For each region, the HRTD stores the last record number and the last file mark number of the region. LTO tape drives support Virtual High Resolution Tape Directory (vHRTD) which divides a wrap into 32 regions. As used herein, the term "HRTD region" includes regions from HRTD and vHRTD.

Sometimes a tape drive cannot write data to the tape medium due to, for example, the tape drive's data head degradation, or scratches or magnetic debris on the tape medium. The tape drive terminates writing data at that time, but continues to run the tape to allocate the data heads on the narrow data tracks when the drive cannot allocate the writing heads on the narrow data tracks due to scratches or debris on the tape medium. Once the data heads are allocated on the data tracks, the drive resumes writing data to the tape again. However, tape drives are configured such that it is not allowed to keep running the tape indefinitely to allow the data heads to be allocated on the data tracks. Tape drives are generally configured to operate using a 4 meter rule. This rule specifies that the physical distance between the end of a correctly written data set and the end of the subsequent next correctly written data set, on the same wrap, shall not exceed 4 meters. If the data set cannot be completed within 4 meters, the tape drive may reposition and retry the write in the same location or fail the write operation.

A tape drive embeds a large capacitor to keep controlling servo until the motor is stopped safely when the drive power is down (e.g., due to a blackout) while tape is running to read or write data on it. The tape roller which wraps around the tape media controls the tape tension precisely whenever tape is loaded. However, the tape drive occasionally cuts the tape medium when the tape has a scratch or the servo control malfunctions. IBM provides a service to splice pieces of tape together and read back as much data as possible from the tape. In order to recover as much data on the tape as possible, an operator manually moves the tape to a location where the data may be read. If the drive can read back data from there, the drive resumes the recovery process. The operator is required to repeat the operation every time the drive encounters read failure. Since the TS1160 tape drive has 272 wraps, it takes several months to recover data from cut tape.

In a tape drive, writing may not be possible due to deterioration of the tape drive or tape media, scratches on the media, adhesion of debris, or the like. Normally, when a permanent write error occurs, the tape is treated as a read-only tape and discarded after saving the data written on the tape.

When the drive cannot write data at a certain area of the tape medium due to scratches on the medium or adhesion of debris, the drive can keep writing data to the tape medium by changing the writing location to avoid the bad area in most cases.

Embodiments of the present disclosure provide a special mode (write across write perm) for writing to tape when a permanent write error (write perm error) is encountered while writing data to the tape medium. Further embodiments provide for reading from tape that was written in write across write perm mode or when recovering data from a damaged tape such as a torn or cut tape.

In embodiments, when the tape drive encounters a write perm error, the tape drive repositions to the beginning of the next HRTD region after the HRTD region where the error occurred. As used herein, a next HRTD region may be the HRTD region that immediately follows the HRTD region where the write error occurred. If the tape drive encounters a write perm error again, the tape drive repositions the tape to the beginning of the next HRTD region and continues writing data to the tape medium. Since an HRTD region may be 8 meters or longer, the 4 meter rule would be violated. Thus, in order to keep using the usable portion of the tape, the user overrides the 4 meter rule by placing the tape drive into write across write perm mode.

The fact that the data was written in write across write perm mode may be recorded in cartridge memory. When reading back the data from the tape, the tape drive may encounter a read error (READ_NO_DATA_ERROR), which indicates that the tape drive cannot read back the data set at the location the error occurred. The tape drive may read the cartridge memory to determine if write across write perm mode was used to write the data. If write across write perm mode was used, the tape drive may move to the beginning of the next HRTD region to resume reading data sets.

When a user wants to recover data from tape that is partially unreadable, the user may set the tape as if the tape was written using write across write perm mode. During the data recovery process, if the tape drive detects READ_NO_DATA_ERROR, the tape drive moves to the beginning of the next HRTD region to resume reading data sets.

In embodiments, a user may set the tape drive into write across write perm mode by issuing a Mode Select command to the tape drive. A host system may be configured to provide the user with a user interface to issue a Mode Select command to the tape drive.

Various aspects of the present disclosure are described below with reference to flowchart illustrations and/or block diagrams of methods, apparatus (system) and computer program products. Turning to FIG. 1A, an example of a computer system 10 is depicted in which aspects of an embodiment of the present disclosure may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). In the illustrated embodiment, the mass storage devices 14 include a tape data storage system.

Memory device 16 may include such memory as random-access memory (RAM), electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 1B:
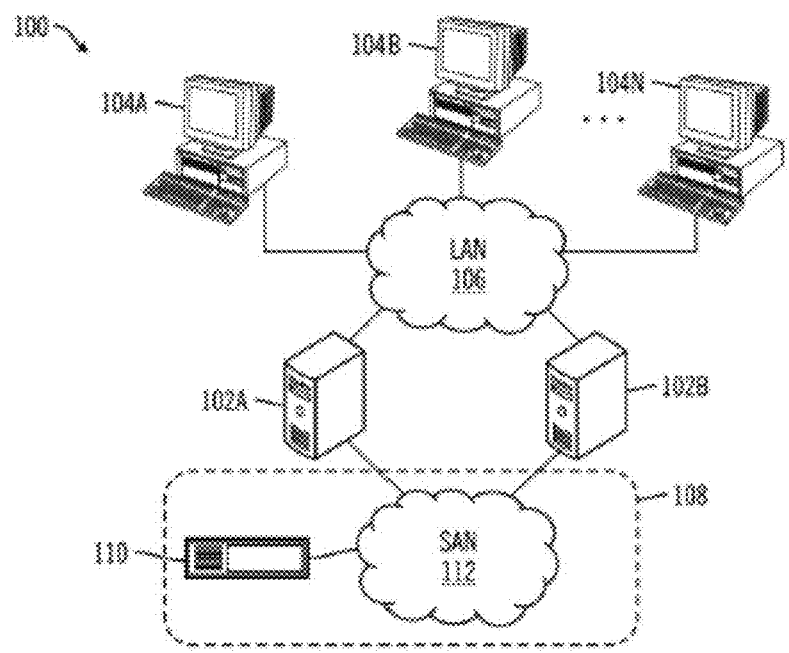
FIG. 1B illustrates a high-level block-diagram representation of an enterprise computer system including a tape storage drive apparatus in which tape reposition management in accordance with the present disclosure may be employed.

FIG. 1B is a high-level block-diagram showing a representation of an enterprise computer system including a tape data storage system in which aspects of an embodiment of the present disclosure may be realized. Examples of enterprise-wide applications include, without limitation, payroll, warehouse, transportation, and batch jobs. Enterprise computer system 100 of FIG. 1B comprises a number of host data processing systems (e.g., server data processing systems 102A, 102B and associated client data processing systems 104A, 104B . . . 104N), which are communicatively coupled together via a first network interconnect (e.g., local area network or "LAN" interconnect 106) as shown. Server data processing systems 102A, 102B of the depicted embodiment are further coupled to a storage system 108 including a number of data storage devices and a second network interconnect (e.g., storage area network or "SAN" interconnect 112). One or more of the server data processing systems 102A, 102B, client data processing systems 104A, 104B . . . 104N, and storage system 108 may be configured for reposition management in accordance with the present disclosure.

In the example embodiment of FIG. 1B, storage system 108 is depicted as including tape data storage system as represented by the tape data storage system 110. In alternative embodiments, storage system 108 may further include any number and type of data storage devices (e.g., individual disk drives, tape drives, disk arrays, tape arrays, RAID array subsystems, robotic tape libraries, filers, file servers) communicatively coupled together and to server data processing systems 102A, 12B via a storage interconnect (SAN interconnect 112), such as a fiber channel (FC) switch, switch fabric, arbitrated loop, or the like. Server data processing system 102A of the embodiment of FIG. 1B comprises an application server (e.g., a database server) to provide core operational functionality to one or more of client data processing systems 104A-104N (where "N" is a positive integer) and server data processing system 102B comprises another server (e.g., a cluster failover server, load-balancing server, backup server, or the like).

Tape data storage system 110 of the depicted embodiment is coupled to SAN interconnect 112 via a communication link as shown. Each communication link may comprise any of a number of communication media capable of transmitting one or more electrical, optical, and/or acoustical propagated signals (e.g., copper wiring, fiber optic cable, or the like) between SAN interconnect 112 and a communication port of tape data storage system 110.

In the illustrated embodiment, one or both of the tape data storage system 110 and server data processing system 102A are configured with sufficient functionality to employ tape reposition management in accordance with the present disclosure, to control and/or manage the tape repositioning and access provided to data of a tape data storage medium within a tape cartridge coupled with tape data storage system 110 as will be further described herein. However, it is appreciated that one or more of the computer systems 10, 22, 23 (FIG. 1A), server data processing systems 102A, 102B (FIG. 1B), client data processing systems 104a, 104b . . . 104n, and data storage system 108, may be configured to employ reposition management in accordance with the present disclosure.

While a conventional SAN-type interconnect (SAN interconnect 112) has been specifically depicted in the embodiment of FIG. 1B, other interconnects (e.g., direct connection, local, metropolitan, and/or wide-area networks) and other protocols (e.g., FICON, ESCON, SSA, or the like) may be utilized. Moreover, while a particular number and arrangement of elements have been illustrated with respect to enterprise computer system 100 of FIG. 1B, it should be appreciated that embodiments of the present disclosure are not limited to enterprises, systems, or data storage devices having any particular number, type, or arrangement of components and so may encompass a wide variety of system types, architectures, and form factors.

Figure 2:
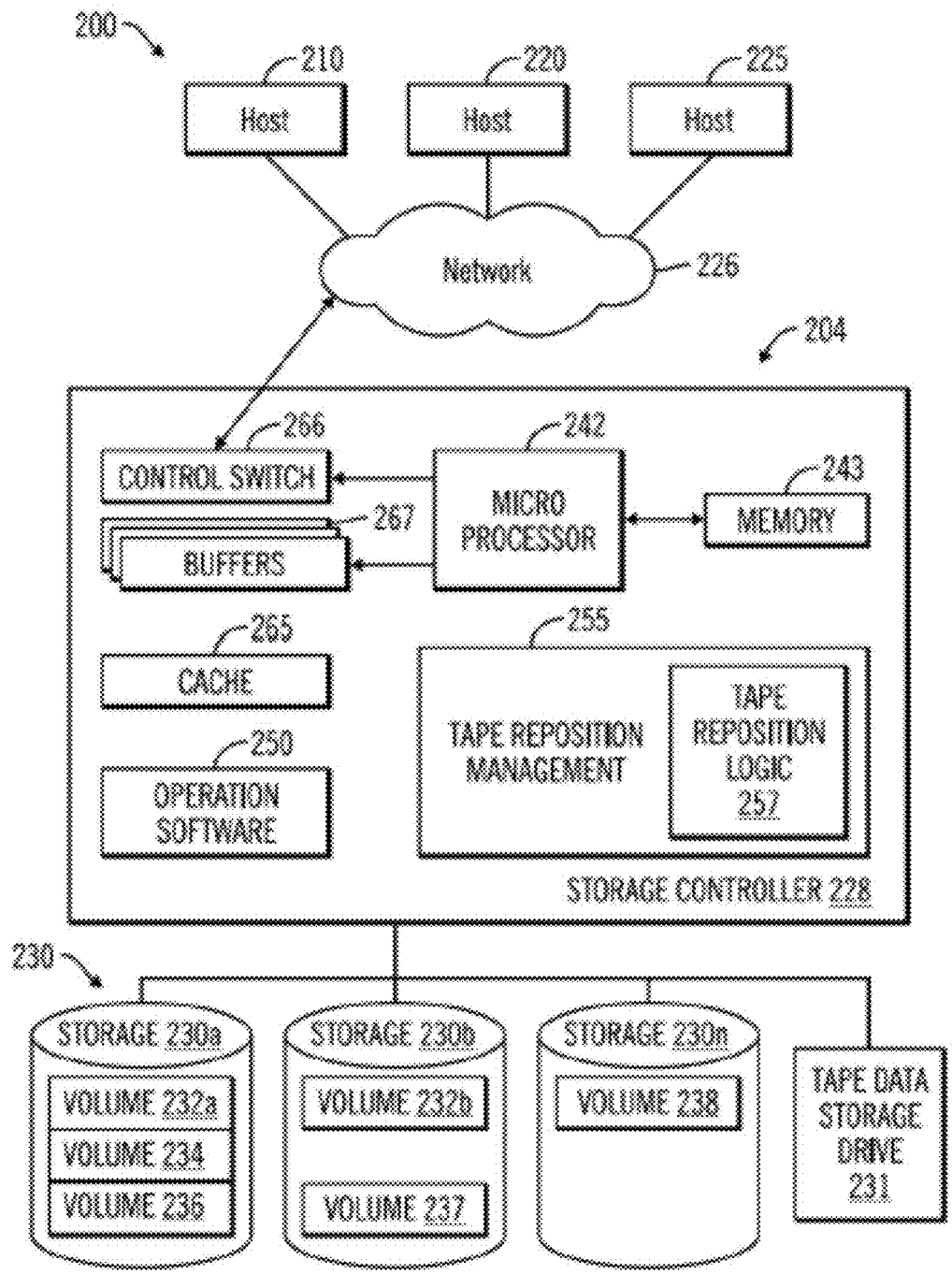
FIG. 2 illustrates a block diagram of an example hardware and software structure of a data storage system in a computer system, according to embodiments.

In an alternative embodiment, FIG. 2 is an example computer system 200 showing a hardware and software structure of a data storage system 204. Host computers 210, 220, 225, are shown, each acting as a central processing unit for performing data processing as part of the computer system 200 which includes a data storage system 204. The hosts (physical or virtual devices), 210, 220, and 225 may be one or more physical devices or logical devices to accomplish the purposes of an embodiment of the present disclosure. In one embodiment, by way of example only, a data storage system 204 may be implemented as IBM® System Storage™ DS8000™ which has been modified to employ tape reposition management in accordance with the present disclosure.

A Network connection 226 may be a fiber channel fabric, a fiber channel point to point link, a fiber channel over ethernet fabric or point to point link, a FICON or ESCON I/O interface, any other I/O interface type, a wireless network, a wired network, a LAN, a WAN, heterogeneous, homogeneous, public (i.e., the Internet), private, or any combination thereof. The hosts, 210, 220, and 225 may be local or distributed among one or more locations and may be equipped with any type of fabric (or fabric channel) (not shown in FIG. 2) or network adapter to the storage controller 228, such as Fibre channel, FICON, ESCON, Ethernet, fiber optic, wireless, or coaxial adapters. Data storage system 204 is accordingly equipped with a suitable fabric (not shown in FIG. 2) or network to communicate. Data storage system 204 is depicted in FIG. 2 comprising storage controller 228, and storage 230 including tape data storage drive 231 controlled by the storage controller 228.

Storage 230a,230b . . . 230n of storage 230 may be physically comprised of one or more storage devices, such as storage arrays. A storage array is a logical grouping of individual storage devices, such as a hard disk or a tape data storage drive. In certain embodiments, one or more of storage 230a, 230b . . . 230n is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request. Moreover, the tape data storage system 110 (see FIG. 1B), as described in FIG. 1B and FIG. 3, may be implemented with the architecture described in FIG. 2.

In one embodiment, by way of example only, the storage system as shown in FIG. 2 may include a logical volume, or simply "volume," and may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b and a full volume 237. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

To facilitate a clearer understanding of aspects of the present disclosure, storage controller 228 is shown in FIG. 2 as a single processing unit, including a microprocessor 242, system memory 243 which may include nonvolatile storage ("NVS") described in more detail below. It is noted that in some embodiments, storage controller 228 is comprised of multiple processing units, each with their own processor complex and system memory, and interconnected by a dedicated network within data storage system 204. In some embodiments, the devices included in storage 230 may be connected in a loop architecture.

Storage controller 228 manages storage 230 and facilitates the processing of write and read requests intended for storage 230. The system memory 243 of storage controller 228 stores program instructions and data, which the processor 242 may access for executing functions and methods of an embodiment of the present disclosure for executing and managing storage 230 as described herein. In one embodiment, system memory 243 includes, in association with, or in communication with the operation software 250, tape reposition management 255 for performing methods and operations employing reposition management in accordance with the present disclosure. One aspect of the tape reposition management 255 is to control tape reposition logic 257 which controls the position of the tape of a tape data storage drive 231 FIG. 3). Although the tape reposition logic 257 is depicted as a component of the tape reposition management 255, it is appreciated that the tape reposition logic 257 may be located in other components of the system such as one or more of the storage controller 228, a host 210-225, network 226, and tape storage drive 231. In a similar manner, although the logic of the tape management 255 is depicted as a component of the storage controller 228, it is appreciated that the tape reposition management 255 may be located in other components of the system such as one or more of the tape storage drive 231, a host 210-225, and a network 226. Thus, tape reposition management 255 may be implemented with one or more of hardware, software, and firmware, alone or in combination.

As shown in FIG. 2, system memory 243 may also include or be in communication with a cache 265 for storage 230, also referred to herein as a "cache memory", for buffering "write data" and "read data", which respectively refer to write/read requests and their associated data. In one embodiment, cache 265 is allocated in a device external to system memory 243, yet remains accessible by microprocessor 242 and may serve to provide additional security against data loss, in addition to carrying out the operations as described in herein.

In some embodiments, cache 265 is implemented with a volatile memory and nonvolatile memory and coupled to microprocessor 242 via a local bus (not shown in FIG. 2) for enhanced performance of data storage system 200. An NVS portion of the memory 243 included in data storage controller is accessible by microprocessor 242 and serves to provide additional support for operations and execution of an embodiment of the present disclosure as described in other figures. The NVS may also referred to as a "persistent" cache, or "cache memory" and is implemented with nonvolatile memory that may or may not utilize external power to retain data stored therein. The NVS may be stored in and with the cache 265 for any purposes suited to accomplish the objectives of an embodiment of the present disclosure. In some embodiments, a backup power source (not shown in FIG. 2), such as a battery, supplies NVS with sufficient power to retain the data stored therein in case of power loss to data storage system 200. In certain embodiments, the capacity of NVS is less than or equal to the total capacity of cache 265.

The storage controller 228 includes a control switch 266 for controlling the communication protocol such as a fiber channel protocol, for example, to the host computers 210, 220, 225. Buffers 267 assist the cache 265 in temporarily storing (buffering) read and write data.

Figure 3:
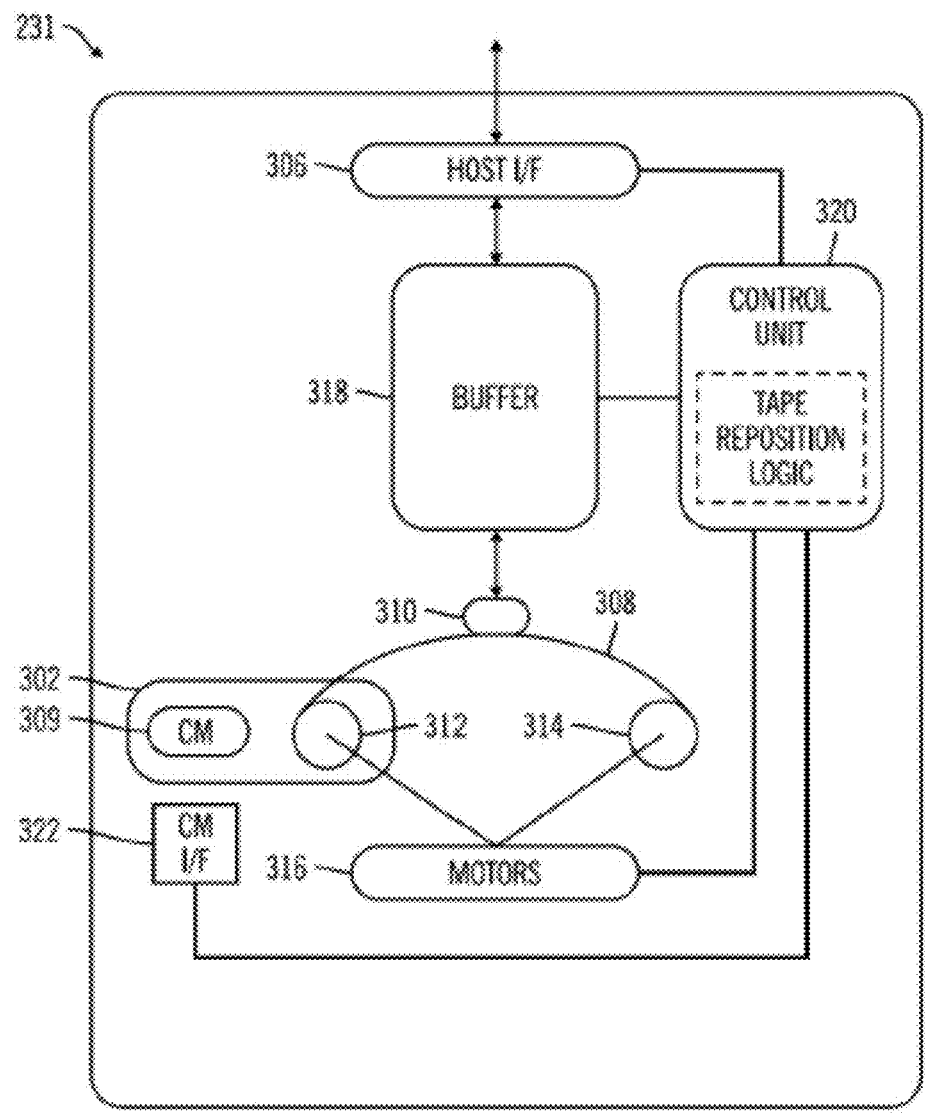
FIG. 3 illustrates a block diagram of an example tape storage drive apparatus in which tape reposition management in accordance with the present disclosure may be employed, according to embodiments.

FIG. 3 is a block diagram depicting an example tape data storage drive 231 according to embodiments of the present disclosure. The tape data storage drive 231 comprises a removable data storage tape cartridge 302 and a communication interface (e.g., host data processing system interface (I/F) 306) to communicatively couple tape data storage drive 231 to the storage controller 228 (FIG. 2) or alternatively, one or more host data processing systems or associated communication channels (e.g., SAN interconnect 112).

The communication I/F 306 is configured to receive input/output (I/O) operation requests (e.g., "read" and/or "write" requests), and process such requests in an appropriate manner to control or "manage" access to a tape data storage medium 308 (e.g., magnetic tape) of removable data storage tape cartridge 302 as described herein. In addition to tape data storage medium 308, data storage tape cartridge 302 comprises a cartridge memory (CM) 309 which in one embodiment, includes a passive, contactless silicon storage device utilized to store data about the tape cartridge 302 in which it resides. Exemplary data may include, for example, data indicating the associated tape cartridge's volume serial number (VOLSER), the "type" of data storage medium within the cartridge, data format type and the data, if any, which is stored thereon. Further, as will be discussed herein, the cartridge memory may further store an indicator that a particular write mode (e.g., write across write perm mode) is being used for the tape cartridge.

Tape data storage medium 308 of removable data storage tape cartridge 302 is routed in proximity to a tape access (e.g., read/write) head 310 utilizing media transport reels 312 and 314 and one or more media transport motors 316 as shown. The tape access head 310 is configured to read data from and write data to tape data storage medium 308 and to temporarily store or "stage" such data within a buffer 318 (e.g., one or more "read-ahead" or staging buffers).

When writing data on a tape 308 (FIG. 3) or reading data from a tape 308, the tape 308 is moved relative to the read/write head 310 to the position of the data to be written or read in advance. The process of moving to the target data position is typically referred to as a "reposition" process and is performed in response to a reposition request issued by a storage controller.

In an example embodiment, tape cartridge 302 meets the standard specifications of one or more of a TS11xx tape drive such as, for example, the TS1160 or a LTO generation standard such as, for example, the LTO-7 tape drive. In such an embodiment, supply reel 312 may be a part of the tape cartridge and connected to beginning of the tape 308, and the end of tape 308 is connected to a leader pin (not shown) which is mechanically grasped by features (not shown) of tape data storage drive 231 and threaded onto take-up reel 314.

A control unit 320 includes read logic and write logic for reading data from and writing data to the tape of the tape storage drive. Thus, the control unit 320 controls and manages data flow, formatting, and data storage subsystem operation via control signals issued to one or more of communication I/F 306, buffer 318, media transport motors 316, and/or CM I/F 322 utilized to access (read or write) data stored in CM 309.

In the illustrated embodiment some or all of the functions of the tape reposition logic 257 (FIG. 2) may be located within the control unit 320 of the tape storage drive 231. In another embodiment, such control functionality may be incorporated into one or more of other components of the tape data storage drive 231. In a similar manner, although the control unit 320 is depicted in FIG. 3 as a part of a tape storage drive 231, it is appreciated that logic of the control unit may be located in one or more of various components of the system such as one or more of the storage controller 228, a host 210-225, and network 226, as well as the tape storage drive 231. Alternatively, some or all of the component functions may be implemented in hardware devices, such as in Application Specific Integrated Circuits (ASICs), Field Programmable Gate Array (FPGA) or executed by separate dedicated processors.

The memory 16 may comprise one or more memory devices volatile or non-volatile, such as a Dynamic Random Access Memory (DRAM), a phase change memory (PCM), Magneto resistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

The storage 108 may comprise different types or classes of storage devices of the SAN 112, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in the storage 108 may further be configured from an array of devices, such as Just a Bunch of Disks (JBOD), Direct Access Storage Device (DASD), Redundant Array of Independent Disks (RAID) array, virtualization device, etc. Further, the storage 108 may comprise heterogeneous storage devices from different vendors and different types of storage devices, such as a first type of storage devices, e.g., hard disk drives, that have a slower data transfer rate than a second type of storage devices, e.g., SSDs.

The storage 108 may comprise a cloud storage system provided by a cloud storage service provider. Examples of cloud storage service providers include DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world).

The network 106 may include, without limitation, a Storage Area Network (SAN), Local Area Network (LAN), Intranet, the Internet, Wide Area Network (WAN), peer-to-peer network, wireless network, and arbitrated loop network. Accordingly, the enterprise computer system 100 includes a storage system 108 coupled to a server 102 through a network 112.

Figure 4:
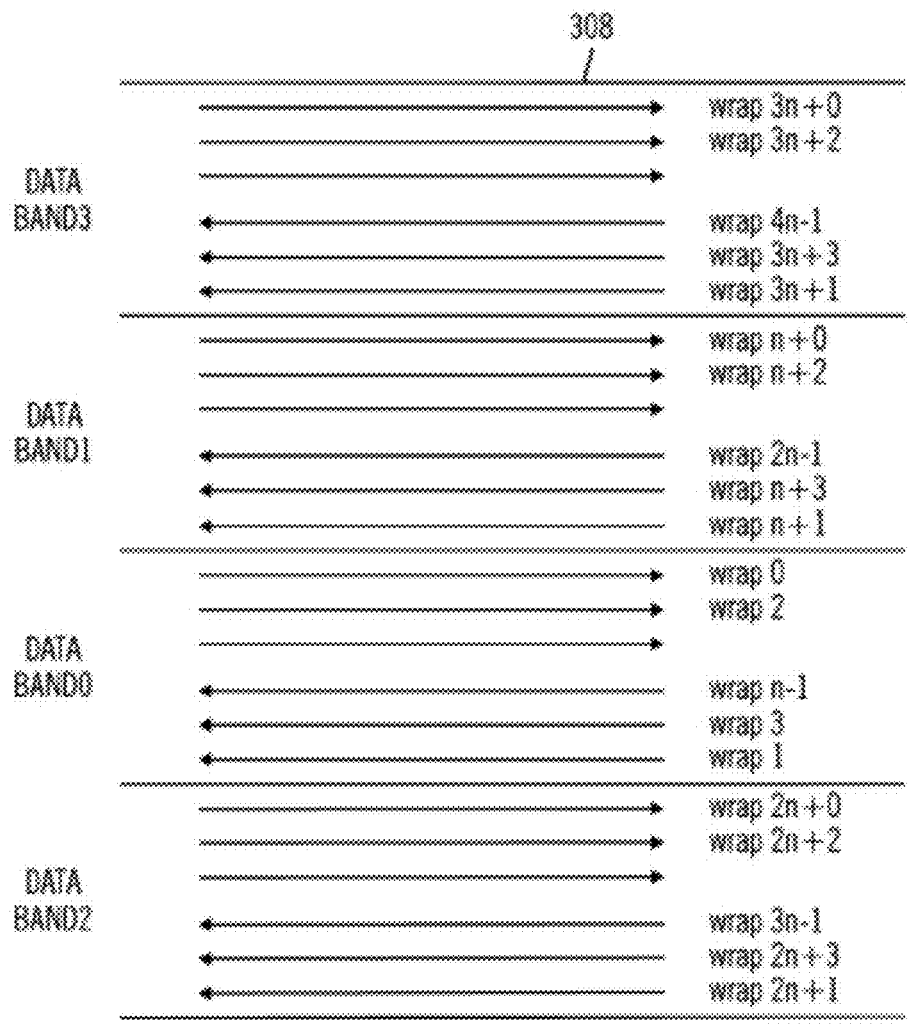
FIG. 4 illustrates a band structure of a tape in a tape storage drive system, according to embodiments.
Figure 5A:
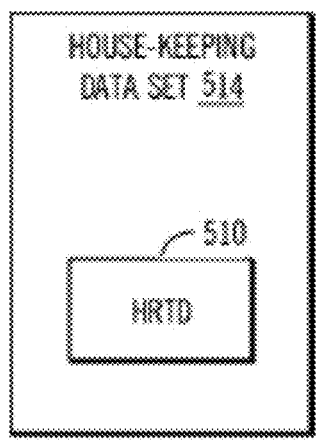
FIG. 5A illustrates a tape housekeeping data structure in which a High Resolution Tape Directory (HRTD) is recorded, according to embodiments.

In the illustrated embodiment, the tape data storage drive 231 is a linear system in which the width direction of the tape is divided into a plurality of areas (wraps) in a conventional manner as shown in FIG. 4. The data is recorded from the beginning to the end and from the end to the beginning of the tape in the tape length direction represented by an arrow for each wrap. The width of the area in the tape width direction in which valid data for each wrap is written is called a track width (track pitch Wtp). As shown in FIG. 4, recording is performed on the track while traveling from the beginning to the end (forward) in the even wrap, and recording is performed while traveling from the end to the beginning (backward) in the odd wrap. In one known tape standard, a HRTD (High Resolution Tape Directory) data structure 510 (FIG. 5A) is stored in a tape portion called the House Keeping data set 514 defined before the first user data area of the tape and is read when the tape is loaded.

For example, an LTFS magnetic tape medium wrap allocation in accordance with the LTO-7, standard, a magnetic tape may have 112 wraps allocated to four data bands, (data band0-band3) where each band has 28 wraps, that is, data band0 has 28 wraps wrap0-wrapn−1, data band1 has 28 wraps wrapn+0-wrap2n−1, data band2 has 28 wraps wrap2n+0-wrap3n−1, and data band3 has 28 wraps wrap3n+0-wrap4n−1. All the data wraps may be formatted into a single partition from wrap 0 to wrap 111 or for example, other formats may be used, depending upon the particular applications. For example, one known LTFS standard may divide the tape into two partitions in which a first partition includes wraps 0-1 that may be used for metadata and a second partition includes wraps 4-111 for data retention associated with the metadata. For example, an LTFS typically creates a 2-partition tape when formatting the tape. Wrap 0 and wrap 1 are used to provide an Index Partition. Wrap 2 and wrap 3 are typically used as guard bands. From wrap 4 to the last wrap, a Data Partition is provided for storing user data which may be constructed with standard records of the tape drive system.

Figure 6:
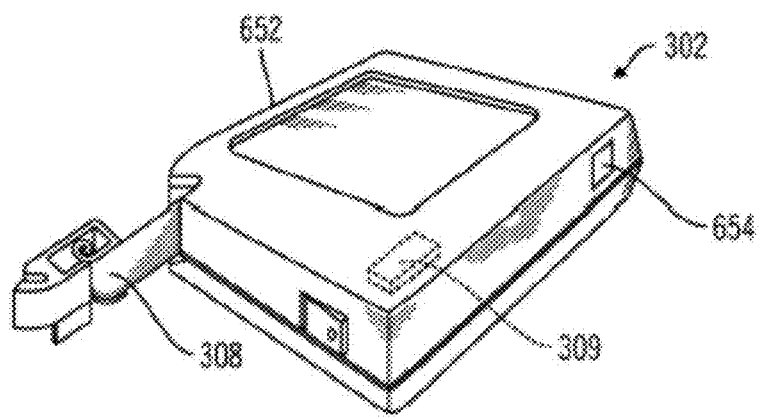
FIG. 6 illustrates an example of a tape cartridge which may be employed in the tape storage drive apparatus of FIG. 3, according to embodiments.

FIG. 6 illustrates an example embodiment of a tape cartridge 302 suitable for use with a tape data storage system such as tape data storage drive 231 shown in FIG. 3. According to an example embodiment, tape cartridge 302 includes housing 652, magnetic tape medium 308 ("tape") in housing 652, and cartridge memory 309 coupled to housing 652. In other embodiments, cartridge memory 309 may be embedded inside housing 652. In further embodiments, cartridge memory 309 may be attached to the inside or outside of housing 652 without modification of housing 652. The cartridge 302 may also have identifying indicia 654 in or on the housing 652.

According to an example embodiment, control unit 320 (FIG. 3) uses cartridge memory 309, via cartridge memory reader or interface 322, as a temporary storage for information about data that is to be written in both running directions of magnetic tape medium 308, such as a generation value of LTFS indexes. In further embodiments, cartridge memory 309 may store information regarding tape partitioning, and other information regarding using of the magnetic tape medium 308 such as a tape directory (TD) for example.

In known tape data storage drive systems, a tape reposition request identifies a target location which is identified by a record number of a target record, or a file mark number of a target file mark. A file mark is a data structure which delimits an area or subarea of a file which is composed of an arbitrary number of records. However, the precise location of each file mark is typically not available to the storage controller or the tape data storage drive. Typically, read logic in a tape drive storage system does not know precisely where the target record or file mark is written on the tape. Instead, a data structure often referred to as a "Tape Directory (TD)" is frequently used to determine which general area of the tape the target record is located.

For example, in an LTO tape drive, one wrap is divided into two subareas. In such systems, the tape directory identifies which subarea of the two subareas, the target record is located. By comparison, in known tape drives such as the TS1160 for example, which is marketed by IBM, each wrap is divided into 128 smaller subareas in the tape length direction. In such systems, in addition to the TD data structure, a High Resolution Tape Directory (HRTD) data structure 510 (FIG. 5A) identifies for each record recorded on the tape, the particular subarea of the 128 subareas, in which the target record was recorded. As previously noted, the HRTD (High Resolution Tape Directory) data structure 510 (FIG. 5A) is stored in a tape data portion called the Housekeeping data set 514.

Thus, in known systems having HRTD type directories, upon receiving a reposition request to reposition the tape to read a specified target record, the HRTD data structure is examined to identify which particular subarea of the possible 128 subarea, contains the specified target record number or file mark number. In known tape drive systems, the physical location of each HRTD subarea of the tape is known to tape reposition logic. Accordingly, the tape is repositioned by the tape reposition logic to the particular subarea identified by the HRTD data structure. Read logic of the tape drive system then searches records of the data set located in the area in order from the beginning of the area.

Records stored in each area or subarea of the tape are often collectively referred to as a data set. Known tape drive systems utilize a Data Set Information Table (DSIT) which identifies the number of records in the data set which occupies an area of subarea of the tape. The number of file marks in a particular data set is also known as is the file mark number of the file mark at the beginning of the data set. Using the target record number of the specified target record of the target data set, the number of records recorded in the target data set as indicated in the DSIT, and the first file mark number and the number of file marks in the target data set, read logic of a known tape drive can check if the target record is to be found in the target data set. Once the desired record is confirmed to be in the data set being checked, the reposition request is terminated. Accordingly, reading of the data set or data sets is continued until a data set including the desired record is found.

Figure 5B:
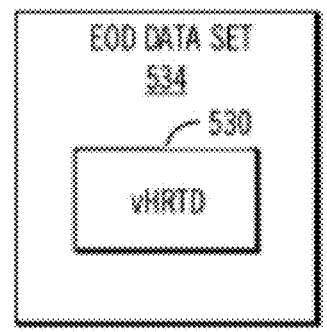
FIG. 5B illustrates an End of Data (EOD) data structure in which a virtual High Resolution Tape Directory (vHRTD) is recorded, according to embodiments.

It is appreciated that in tape drive systems which utilize an HRTD data structure in the housekeeping data set of the tape, a specified record may be relatively quickly located since each tape wrap is subdivided into relatively small regions and the HRTD data structure identifies the records in each such region. Thus, a search of a relatively small region for a specified record may be completed quickly. On the other hand, the specifications of an LTO tape drive may be defined by a different standard. As a result, a data set such as an HRTD data structure generally cannot be written in the housekeeping data set in known LTO tape drives. To address this issue, known LTO tape drives marketed by IBM create information which is the same or similar to that found in an HRTD data structure. This HRTD type information is recorded as a virtual HRTD (vHRTD) in the free space of a data set called End of Data (EOD) which is typically written last in a data write to the tape. FIG. 5B shows an example of a known vHRTD 530 recorded in an EOD data set 534 of a data partition described below.

However, in known tape drive systems, the EOD data set is not read when the tape is loaded and mounted. As a result, the vHRTD is not read in connection with loading and mounting a tape and thus is not available to facilitate application requested read operations following loading and mounting of a tape. Consequently, tape access operations in response to application access requests received after loading and mounting of the tape do not utilize the vHRTD directory for an interval of time following completion of loading and mounting of the tape. However, it is appreciated that eventually an access request may be received from a host, which causes the vHRTD to be read from EOD. Examples of such subsequent access include data being appended from or near the EOD data set being accessed as a result of the host requested access. Until such an access request is received, the vHRTD remains unread, slowing host requested accesses during the intervening period. However, once an access is received which causes the vHRTD to be read, subsequent repositions can be executed at high speed using vHRTD.

Figure 7:
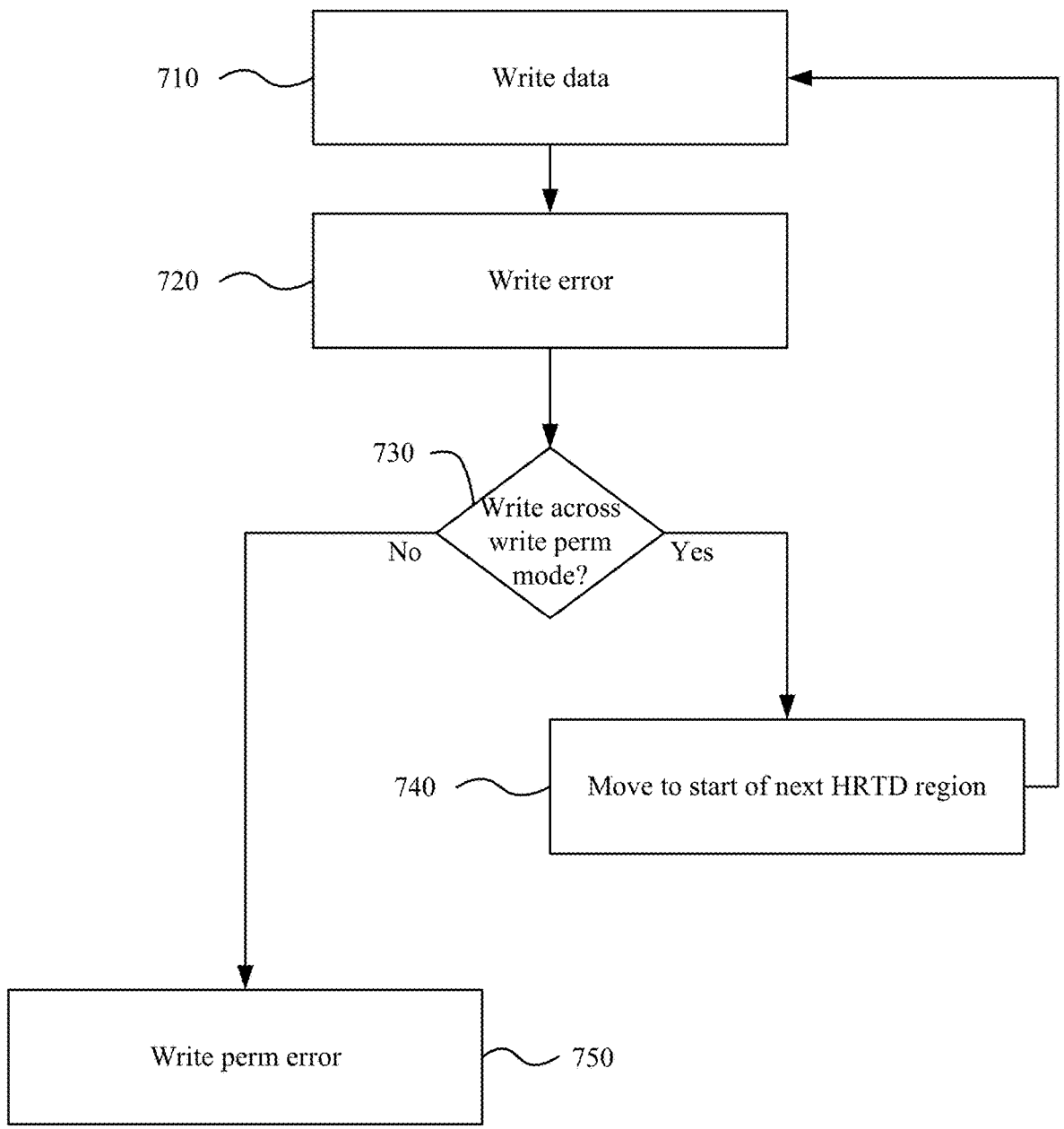
FIG. 7 depicts a flow chart of an example method for writing data to tape, according to embodiments.

Referring now to FIG. 7, a flow chart of an example method 700 for writing data to tape is depicted, according to embodiments. Method 700 may be performed by a tape storage system including a tape drive. Method 700 may be performed by any suitable logic device within the tape storage system. For example, method 700 may be performed by a tape drive controller (e.g., control unit 320) and/or a storage controller (e.g., storage controller 228). Method 700 may be performed while the tape drive is operating in write mode.

At operation 710, the tape drive writes data to tape. At operation 720, the tape drive identifies a write error while writing to the tape.

At operation 730, it is determined whether write across write perm mode is set. In some embodiments, the state of write across write perm mode is stored in the cartridge memory of a tape cartridge. An indicator indicating write across write perm mode is set may be stored in the cartridge memory in response to receiving a mode select command from a host device to put the tape cartridge into write across write perm mode. The indicator may be any suitable data stored in cartridge memory to indicate that write across write perm mode is set for the tape cartridge. In some embodiments, the tape drive itself may be set into write across write perm mode. For example, an indicator may be stored in the tape drive or storage system to indicate that write across write perm mode is set for the tape drive in response to a mode select command from a host. In these embodiments, an indicator may not be stored in the cartridge memory until after the write across write perm mode is utilized on the tape cartridge (e.g., after operation 740 discussed below).

If write across write perm mode is set (e.g., the indicator is present in cartridge memory), the tape is repositioned to the start of the next HRTD region at operation 740. That is, the tape may be repositioned from the current HRTD region to the beginning of the HRTF region subsequent to the current HRTD region. The next HRTD region may be located by reading the HRTD or vHRTD. Then, at operation 710, the tape drive continues writing data to tape at the next HRTD region.

If write across write perm mode is not set (e.g., the indicator is not present in cartridge memory), a write perm error occurs at operation 750. The write perm error may be handled according to known methods. Although not depicted, in some embodiments, a notification of the write perm error may be provided to a host system to allow the host to place the tape cartridge in write across write perm mode.

Figure 8:
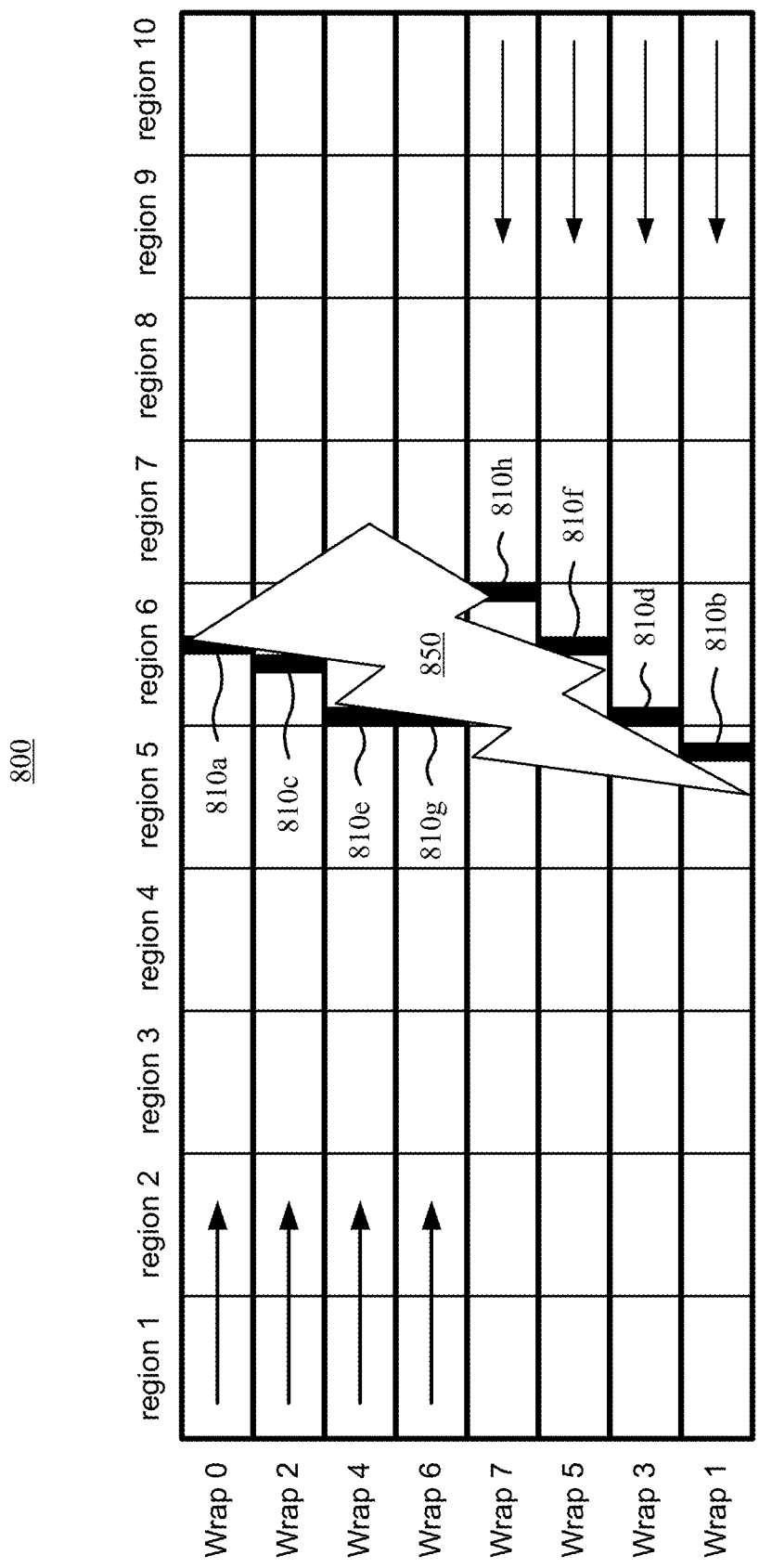
FIG. 8 depicts an illustrative diagram of an example tape for describing writing to tape according to embodiments of the present disclosure.

Referring now to FIG. 8, an illustrative diagram of an example tape 800 for describing writing to tape according to embodiments of the present disclosure is depicted. Tape 800 includes 10 HRTD regions on each wrap (region 1-region 10) and 8 wraps (Wrap 0-Wrap7). Tape 800 is depicted with debris 850 covering portions of tape 800 that causes write errors 810a-h (collectively referred to as write errors 810) when writing to tape 800. The arrows on each wrap show the direction of the write on the corresponding wrap. For example, wrap 0 is written from region 1 to region 10, then wrap 1 is written from region 10 to region 1.

As depicted in FIG. 8, while writing in Wrap 0, write error 810a is identified while writing to HRTD region 6. According to embodiments of the present disclosure, in response to being in write across write perm mode, the tape drive may reposition the tape to the beginning of HRTD region 7 and attempt to continue the write. Since the debris 850 does not impact HRTD region 7 on Wrap 0 the write may be successfully continued.

The tape drive may continue to write until identifying write error 810b in HRTD region 5 of Wrap 1. The tape drive may reposition the tape to HRTD region 4 and continue the write. Since the debris 850 does not impact HRTD region 4 on Wrap 1 the write may be successfully continued.

The tape drive may continue to write until write error 810c in HRTD region 6 of Wrap 2. The tape drive may reposition the tape to HRTD region 7 and attempt to continue the write. However, because the debris 850 extends to HRTD region 7, the tape drive is unable to write there. The tape drive may reposition the tape to HRTD region 8 and continue the write.

The tape drive may continue to write until write error 810d in HRTD region 6 in Wrap 3. The tape drive may reposition the tape to HRTD region 5 and continue the write.

The tape drive may continue to write until write error 810e in HRTD region 6 of Wrap 4. The tape drive may reposition the tape to HRTD region 7 and attempt to continue the write. However, because the debris 850 extends to HRTD region 7, the tape drive is unable to write there. The tape drive may reposition the tape to HRTD region 8 and continue the write.

The tape drive may continue to write until write error 810f in HRTD region 6 of Wrap 5. The tape drive may reposition the tape to HRTD region 5 and attempt to continue the write. However, because the debris 850 extends to HRTD region 5, the tape drive is unable to write there. The tape drive may reposition the tape to HRTD region 4 and continue the write.

The tape drive may continue to write until write error 810g in HRTD region 6 of Wrap 6. The tape drive may reposition the tape to HRTD region 7 and attempt to continue the write. However, because the debris 850 extends to HRTD region 7, the tape drive is unable to write there. The tape drive may reposition the tape to HRTD region 8 and continue the write.

The tape drive may continue to write until write error 810h in HRTD region 6 of Wrap 7. The tape drive may reposition the tape to HRTD region 5 and attempt to continue the write. However, because the debris 850 extends to HRTD region 5, the tape drive is unable to write there. The tape drive may reposition the tape to HRTD region 4 and continue the write.

Figure 9:
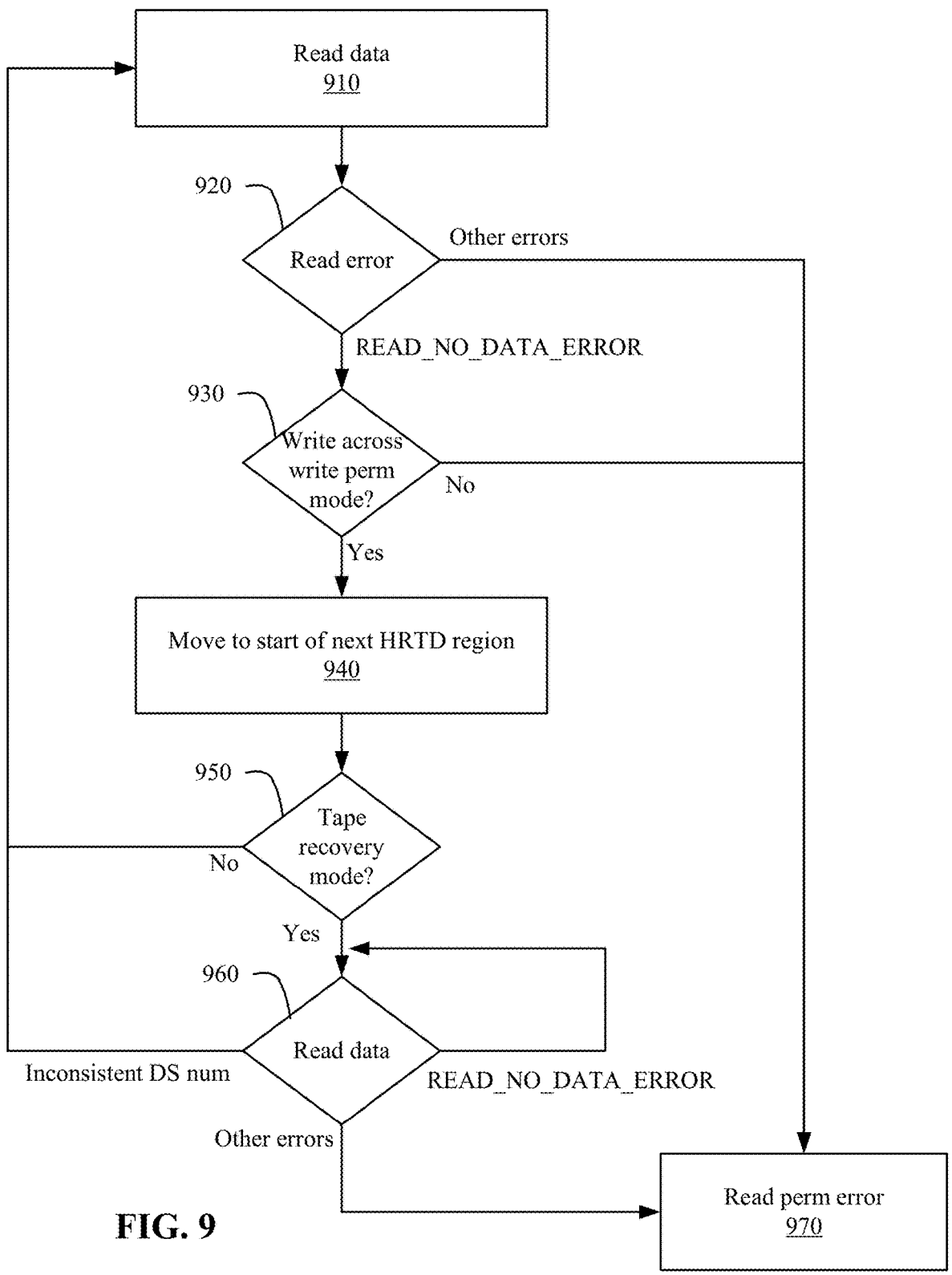
FIG. 9 depicts a flow chart of an example method for reading data from tape, according to embodiments.

Referring now to FIG. 9, a flow chart of an example method 900 for reading data from tape is depicted, according to embodiments. Method 900 may be performed by a tape storage system including a tape drive. Method 900 may be performed by any suitable logic device within the tape storage system. For example, method 900 may be performed by a tape drive controller (e.g., control unit 320) and/or a storage controller (e.g., storage controller 228). Method 900 may be performed while the tape drive is operating in read mode.

At operation 910, the tape drive reads data from the tape. At operation 920, a read error occurs. If the read error is "READ_NO_DATA_ERROR", then the method proceeds to operation 930. However, if the read error is any other error, a read perm error occurs at operation 970.

At operation 930, the tape drive determines whether the write across write perm mode is set. In some embodiments, the tape drive reads the cartridge memory of the tape cartridge to determine if an indicator for write across write perm mode is present. The indicator may have been written to the cartridge memory previously (e.g., prior to writing at least some of the data to the tape). However, write across write perm mode may be set for the tape cartridge at any time. For example, a host may communicate a mode select command to the tape storage system indicating that the tape cartridge should be set to write across write perm mode after data has already been written to the tape. This may be helpful in reading data from a tape that has been torn as will be discussed herein. If write across write perm mode is not active, a read perm error occurs at operation 970.

If write across write perm mode is set, at operation 940, the tape drive repositions the tape to the start of the next HRTD region. The location of the next HRTD region may be determined by reading an HRTD or vHRTD.

At operation 950, it is determined whether tape recovery mode is set. Tape recovery mode may be set by a mode select command from a host. An indicator indicating that tape recovery mode is set may be stored in the cartridge memory. In some embodiments, the tape drive may be set into tape recovery mode with an indicator stored in the tape drive or storage system to indicate that tape recovery mode is set for the tape drive in response to a mode select command from a host.

If tape recovery mode is not set, the tape drive continues the read at the start of the next HRTD region at operation 910.

If tape recovery mode is set, the tape drive continues the read at the start of the next HRTD region at operation 960. If a "READ_NO_DATA_ERROR" occurs again, the tape drive moves to the next HRTD and reads the tape at operation 960. At operation 960, if an inconsistent data set number is read, the error "Inconsistent DS num" occurs, but it is ignored, and the tape drive continues to read data at operation 910. Note that at operation 920, the Inconsistent DS num error may result in a read perm error at operation 970.

If, at operation 960, other read errors occur, a read perm error may occur at operation 970.

Figure 10:
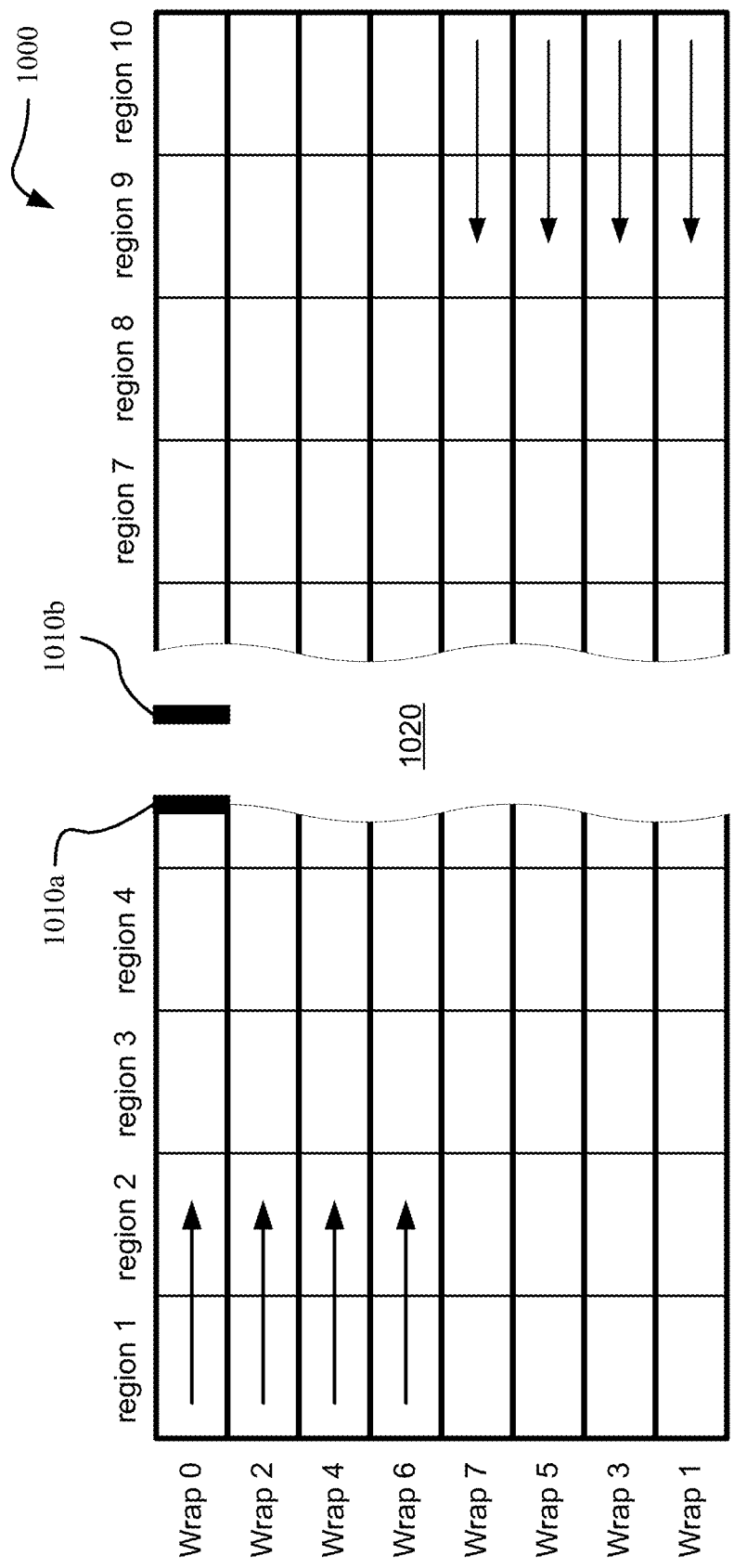
FIG. 10 depicts an illustrative diagram of an example tape for describing reading from tape according to embodiments of the present disclosure.

Referring now to FIG. 10, an illustrative diagram of an example tape 1000 for describing reading from tape according to embodiments of the present disclosure is depicted. As illustrated, tape 1000 has been cut and spliced together at area 1020. Thus, the information at area 1020 is unreadable. When a read is started at the beginning of Wrap 0, a read error 1010a occurs in HRTD region 5. In the case where write across write perm mode is set, the tape drive repositions to the beginning of HRTD region 6 and attempts to read. However, a read error 1010b occurs because the beginning of HRTD region 6 does not exist on the tape. In response, the tape drive repositions the tape to the beginning of HRTD region 7 and continues the read. However, because data sets were missed between the last read data set and the data set at the beginning of HRTD region 7, an Inconsistent DS Num error occurs. In the case where tape recovery mode is set, the Inconsistent DS Num error is ignored, and the tape drive continues to read the data from tape 1000.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code involved in performing the inventive methods, such as tape storage module 1200. In addition to block 1200, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

Figure 11:
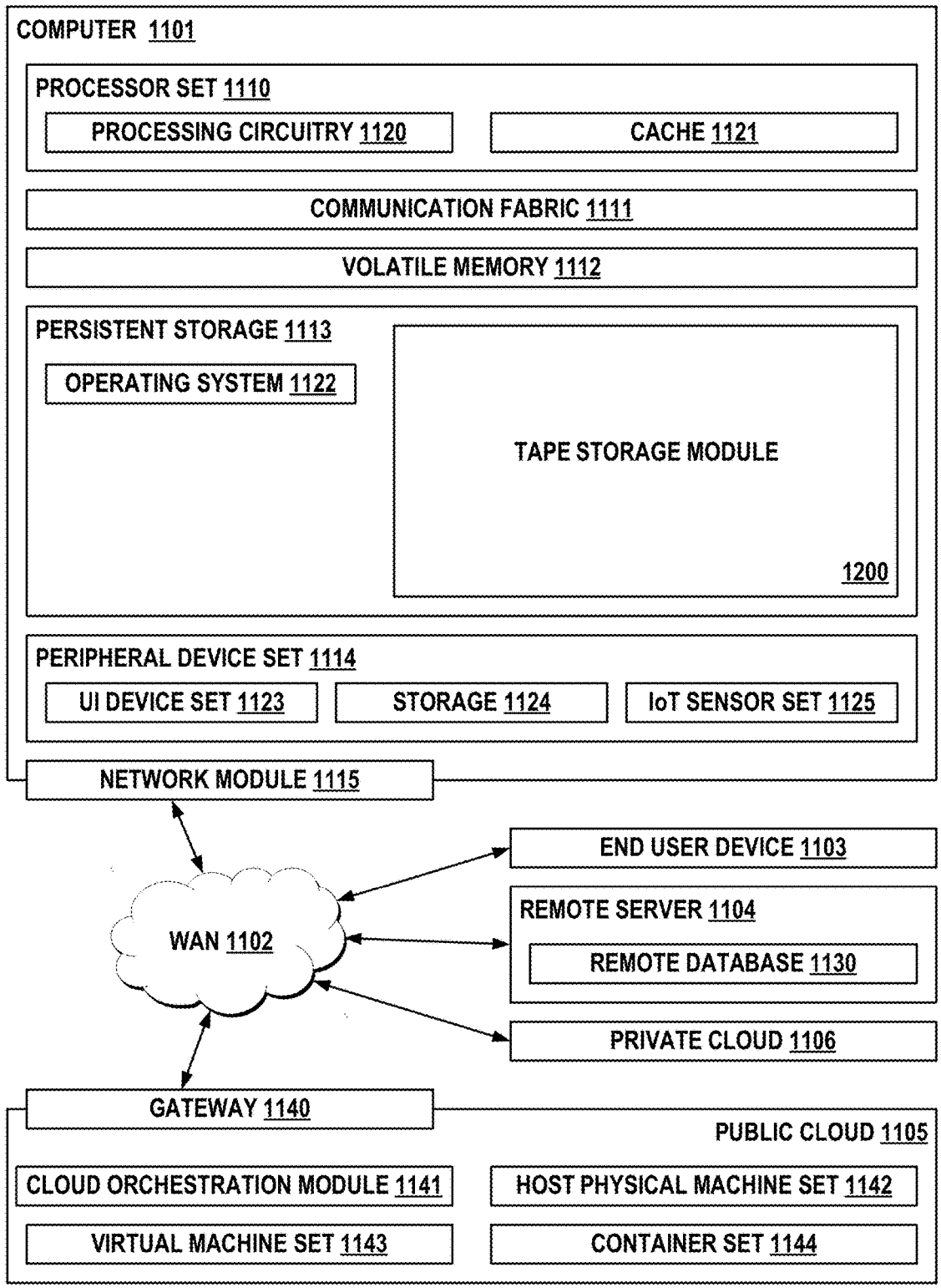
FIG. 11 depicts an example computing environment, according to embodiments.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer-readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer-readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

CLOUD COMPUTING SERVICES AND/OR MICROSERVICES (not separately shown in FIG. 11): private and public clouds 1106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Embodiments of the present disclosure will now be described with reference to the following clauses:

Clause 1. A method for writing to tape by a tape drive, the method comprising:
in response to identifying a write error during a write to a tape in a certain HRTD region, repositioning the tape to a next HRTD region; and
continuing the write at the next HRTD region.

The limitations of clause 1 allow for continuing to write to the tape when conventional methods would treat the tape as read-only tape in response to the write error.

Clause 2. The method of clause 1, wherein repositioning the tape to the next HRTD region is further in response to determining write across write perm mode is set.

The limitations of clause 2 allow for the writing method of clause 1 to be performed only in certain circumstances when the write across write perm mode is set and not in other circumstances.

Clause 3. The method of any of the preceding clauses, further comprising determining write across write perm mode is set by reading a cartridge memory.

The limitations of clause 3 allow for write across write perm mode to be determined based on individual tape cartridges based on their cartridge memory.

Clause 4. The method of any of the preceding clauses, further comprising:
receiving a mode select command from a host to put the tape in write across write perm mode; and
in response to receiving the mode select command, writing an indicator to the cartridge memory, the indicator indicating that write across write perm mode is set.

The limitations of clause 4 allow a host to set the write across write perm mode for a tape cartridge and provide for the tape drive to set the tape cartridge in write across write perm mode such that it can be referenced by reading the cartridge memory of the tape cartridge.

Clause 5. The method of any of the preceding clauses, wherein the write error is a permanent write error.

Clause 6. The method of any of the preceding clauses, further comprising:
while continuing the write at the next HRTD region, identifying a second write error; in response to identifying the second write error, repositioning the tape to a second next HRTD region, the second next HRTD region subsequent to the next HRTD region; and
continuing the write at the second next HRTD region.

The limitations of clause 6 allow for the write to be continued even when the cause of the write error extends into the second next HRTD region.

Clause 7. The method of any of the preceding clauses, further comprising:
in response to identifying a read error during a read of the tape in the certain HRTD region, repositioning the tape to the next HRTD region; and
continuing the read at the next HRTD region.

The limitations of clause 7 allow for reading data from the tape that was written using the method of clause 1. Additionally, the limitations of clause 7 allow for recovering data from tape that has been damaged (e.g., cut or torn).

Clause 8. The method of clause 7, wherein repositioning the tape in response to identifying the read error is further in response to determining write across perm mode is set.

The limitations of clause 8 allow for the limitations of clause 7 to be performed only in certain circumstances when the write across write perm mode is set and not in other circumstances.

Clause 9. The method of clauses 7 or 8, further comprising determining write across write perm mode is set by reading a cartridge memory.

The limitations of clause 9 allow for write across write perm mode to be determined based on individual tape cartridges based on their cartridge memory.

Clause 10. The method of clauses 7, 8, or 9, further comprising:
identifying an inconsistent data set number error while reading at the next HRTD region;
in response to determining tape recovery mode is set, ignoring the inconsistent data set number error.

The limitations of clause 10 allow for a tape drive to ignore an error that might otherwise result in a permanent read error to recover data that can be read.

Clause 11. A method for reading tape by a tape drive, the method comprising:
in response to identifying a read error during a read of the tape in a certain HRTD region, repositioning the tape to a next HRTD region; and
continuing the read at the next HRTD region.

The limitations of clause 11 allow for reading data from the tape that was written using the method of clause 1. Additionally, the limitations of clause 11 allow for recovering data from tape that has been damaged (e.g., cut or torn).

Clause 12. The method of clause 11, wherein repositioning the tape in response to identifying the read error is further in response to determining write across write perm mode is set.

The limitations of clause 12 allow for the limitations of clause 11 to be performed only in certain circumstances when the write across write perm mode is set and not in other circumstances.

Clause 13. The method of clause 11 or 12, further comprising determining write across write perm mode is set by reading a cartridge memory.

The limitations of clause 13 allow for write across write perm mode to be determined based on individual tape cartridges based on their cartridge memory.

Clause 14. The method of clause 11, 12, or 13, further comprising:
identifying an inconsistent data set number error while reading at the next HRTD region;
in response to determining tape recovery mode is set, ignoring the inconsistent data set number error.

The limitations of clause 14 allow for a tape drive to ignore an error that might otherwise result in a permanent read error to recover data that can be read.

Clause 15. A tape storage system comprising a tape drive, the tape drive configured to perform operations comprising:
in response to identifying a write error during a write to a tape in a certain HRTD region, repositioning the tape to a next HRTD region; and
continuing the write at the next HRTD region.

The limitations of clause 1 allow for continuing to write to the tape when conventional methods would treat the tape as read-only tape in response to the write error.

Clause 16. The system of clause 15, wherein repositioning the tape to the next HRTD region is further in response to determining write across write perm mode is set.

The limitations of clause 16 allow for the writing method of clause 15 to be performed only in certain circumstances when the write across write perm mode is set and not in other circumstances.

Clause 17. The system of clause 16, wherein the operations further comprise:
receiving a mode select command from a host to put the tape in write across perm mode; and
in response to receiving the mode select command, writing an indicator to a cartridge memory, the indicator indicating that write across write perm mode is set.

The limitations of clause 17 allow a host to set the write across write perm mode for a tape cartridge and provide for the tape drive to set the tape cartridge in write across write perm mode such that it can be referenced by reading the cartridge memory of the tape cartridge.

Clause 18. The system of clauses 15, 16, or 17, wherein the operations further comprise:
in response to identifying a read error during a read of the tape in the certain HRTD region, repositioning the tape to the next HRTD region; and
continuing the read at the next HRTD region.

The limitations of clause 18 allow for reading data from the tape that was written in write across write perm mode. Additionally, the limitations of clause 7 allow for recovering data from tape that has been damaged (e.g., cut or torn).

Clause 19. The system of clause 18, wherein repositioning the tape in response to identifying the read error is further in response to determining write across perm mode is set.

The limitations of clause 19 allow for the limitations of clause 11 to be performed only in certain circumstances when the write across write perm mode is set and not in other circumstances.

Clause 20. The system of clause 18 or 19, further comprising:
identifying an inconsistent data set number error while reading at the next HRTD region;
in response to determining tape recovery mode is set, ignoring the inconsistent data set number error.

The limitations of clause 20 allow for a tape drive to ignore an error that might otherwise result in a permanent read error to recover data that can be read.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for writing to tape by a tape drive, the method comprising:
in response to identifying a write error during a write to a tape in a certain HRTD region and in response to determining write across write perm is set, repositioning the tape to a next HRTD region; and
continuing the write at the next HRTD region.

2. The method of claim 1, further comprising determining write across write perm mode is set by reading a cartridge memory.

3. The method of claim 2, further comprising:
receiving a mode select command from a host to put the tape in write across write perm mode; and
in response to receiving the mode select command, writing an indicator to the cartridge memory, the indicator indicating that write across write perm mode is set.

4. The method of claim 1, wherein the write error is a permanent write error.

5. The method of claim 1, further comprising:
   while continuing the write at the next HRTD region, identifying a second write error;
   in response to identifying the second write error, repositioning the tape to a second next HRTD region, the second next HRTD region subsequent to the next HRTD region; and
   continuing the write at the second next HRTD region.

6. The method of claim 1, further comprising:
   in response to identifying a read error during a read of the tape in the certain HRTD region, repositioning the tape to the next HRTD region; and
   continuing the read at the next HRTD region.

7. The method of claim 6, wherein repositioning the tape in response to identifying the read error is further in response to determining write across perm mode is set.

8. The method of claim 7, further comprising determining write across write perm mode is set by reading a cartridge memory.

9. The method of claim 6, further comprising:
   identifying an inconsistent data set number error while reading at the next HRTD region; and
   in response to determining tape recovery mode is set, ignoring the inconsistent data set number error.

10. A method for reading tape by a tape drive, the method comprising:
    in response to identifying a read error during a read of the tape in a certain HRTD region and in response to determining write across write perm mode is set, repositioning the tape to a next HRTD region; and
    continuing the read at the next HRTD region.

11. The method of claim 10, further comprising determining write across write perm mode is set by reading a cartridge memory.

12. The method of claim 10, further comprising:
    identifying an inconsistent data set number error while reading at the next HRTD region; and
    in response to determining tape recovery mode is set, ignoring the inconsistent data set number error.

13. A tape storage system comprising a tape drive, the tape drive configured to perform operations comprising:
    in response to identifying a write error during a write to a tape in a certain HRTD region and in response to determining write across write perm mode is set, repositioning the tape to a next HRTD region; and
    continuing the write at the next HRTD region.

14. The system of claim 13, wherein the operations further comprise:
    receiving a mode select command from a host to put the tape in write across perm mode; and
    in response to receiving the mode select command, writing an indicator to a cartridge memory, the indicator indicating that write across write perm mode is set.

15. The system of claim 13, wherein the operations further comprise:
    in response to identifying a read error during a read of the tape in the certain HRTD region, repositioning the tape to the next HRTD region; and
    continuing the read at the next HRTD region.

16. The system of claim 15, wherein repositioning the tape in response to identifying the read error is further in response to determining write across perm mode is set.

17. The system of claim 15, further comprising:
    identifying an inconsistent data set number error while reading at the next HRTD region; and
    in response to determining tape recovery mode is set, ignoring the inconsistent data set number error.

* * * * *